United States Patent [19]

Fluetsch

[11] Patent Number: 4,489,748

[45] Date of Patent: Dec. 25, 1984

[54] LOCKABLE APPARATUS FOR DEACTIVATING A HYDRAULIC SYSTEM

[76] Inventor: Ellis E. Fluetsch, 1291 Westview Dr., Roseburg, Oreg. 97470

[21] Appl. No.: 427,167

[22] Filed: Sep. 29, 1982

[51] Int. Cl.³ .............................................. F16K 35/00
[52] U.S. Cl. ............................. 137/384.4; 137/384.6; 137/491; 137/495; 251/29; 251/44; 70/242; 91/460; 91/461
[58] Field of Search ................. 137/384, 384.2, 384.4, 137/384.6, 384.8, 115, 489, 491, 495; 251/26, 43, 44, 28, 29; 70/242, 263, 360; 91/460, 461

[56] References Cited

U.S. PATENT DOCUMENTS

| | | |
|---|---|---|
| 1,062,154 | 5/1913 | Harnly . |
| 1,153,189 | 9/1915 | Blything .................... 70/242 |
| 1,273,740 | 7/1918 | Clark . |
| 1,316,592 | 9/1919 | Peskind . |
| 1,384,697 | 7/1921 | Hissong . |
| 1,524,904 | 2/1925 | Berardi . |
| 2,613,689 | 10/1952 | Clausen et al. ............ 251/44 |
| 3,090,218 | 5/1963 | Birkness ..................... 70/179 |
| 3,170,579 | 2/1965 | Popelier ..................... 214/138 |
| 3,174,410 | 3/1965 | Booth et al. ............... 137/491 |
| 3,180,355 | 4/1965 | Long .......................... 137/491 |
| 3,401,545 | 9/1968 | Fraser ........................ 137/384.4 |
| 3,987,627 | 10/1976 | Lindstrom ................. 137/115 |

Primary Examiner—A. Michael Chambers
Assistant Examiner—Sheri Novack
Attorney, Agent, or Firm—James D. Givnan, Jr.

[57] ABSTRACT

A valve body is disclosed located in the hydraulic system of a machine which valve serves to direct hydraulic fluid under pressure to hydraulic components or divert the fluid to a system reservoir to prevent component operation. A check valve in the valve body is opened or closed by control means with the check valve indirectly determining the position of a pressure responsive spool for either normal fluid passage to hydraulic components or fluid diversion back to a reservoir. Remote actuation of the control means is by a hand operated air, lockable pump to enable an authorized equipment operator to remotely actuate said control means to effect locking or unlocking of the hydraulic system by positioning the check valve. A modified check valve control dispenses with the air pump and utilizes a lock plunger to bias the check valve to a closed position for normal hydraulic system operation or, conversely, to open the check valve to divert pressurized fluid back to a system reservoir.

3 Claims, 4 Drawing Figures

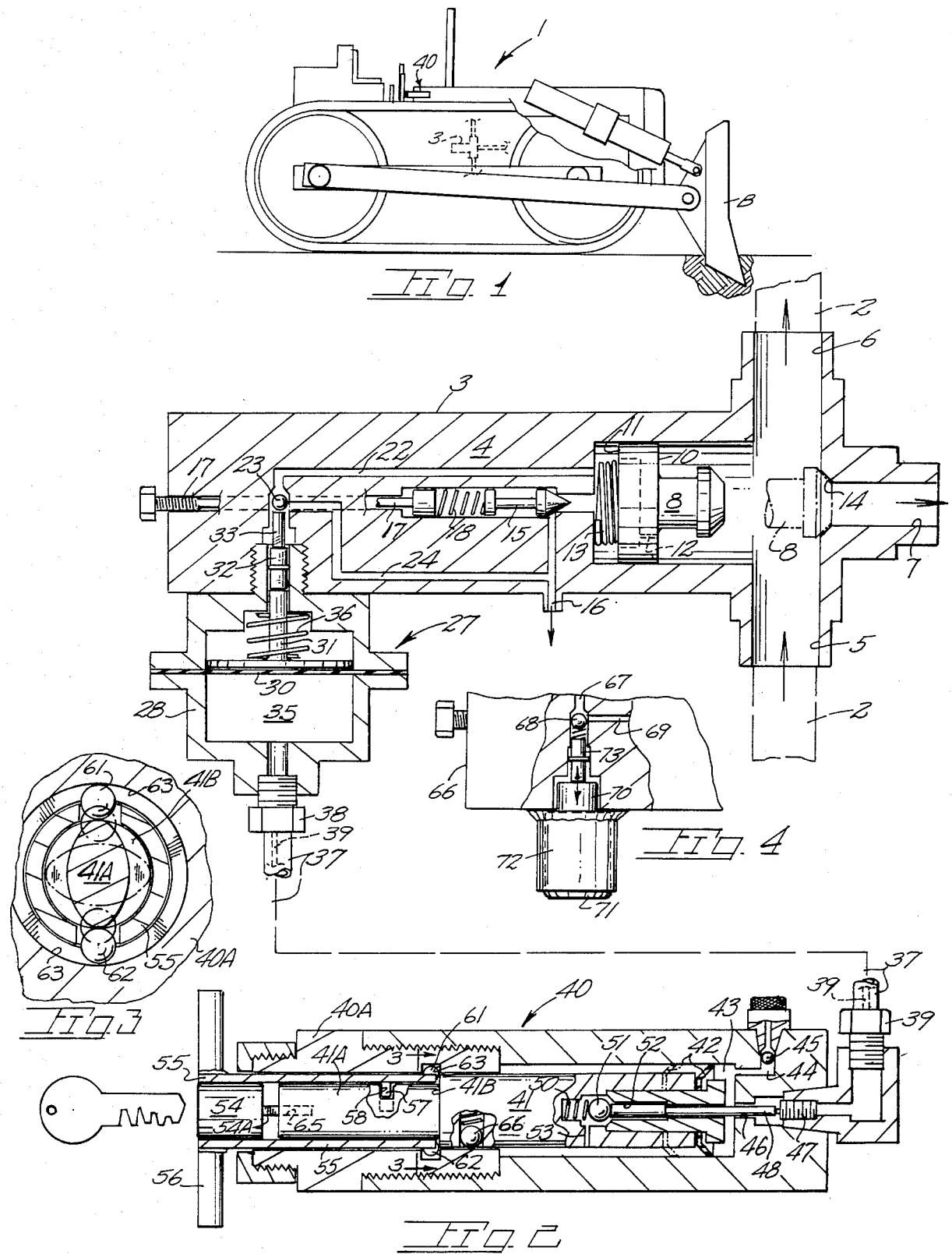

LOCKABLE APPARATUS FOR DEACTIVATING A HYDRAULIC SYSTEM

BACKGROUND OF THE INVENTION

The present invention concerns hydraulic systems for various types of equipment and more particularly to a system for disabling the hydraulic system of a piece of earth moving equipment to prevent unauthorized use or theft of the equipment.

Occurring with considerable frequency is the theft of heavy equipment such as that used at roadway and building construction sites which is left unattended when not in use. The amount of heavy construction equipment lost to theft is in the realm of several millions of dollars each year to contractors and resulting in losses, high insurance premiums as well as the inconvenience and lost time in replacing equipment lost by theft.

Typically construction vehicles such as front end loaders, track equipped tractors, backhoes, graders, etc., have ignition systems which may be circumvented to permit starting without a key which has contributed to the common theft and/or vandalism of same. Once started, typically all hydraulic system components may be operated with no provision made in the vehicles for disabling of the vehicle hydraulic system as a secondary theft prevention measure.

In the prior art, U.S. Pat. Nos. 1,062,154 and 1,384,697 show fuel valves with provision made for remotely locking same closed; U.S. Pat. No. 1,273,740 discloses a manifold lock; U.S. Pat. No. 1,316,592 shows a remote lock for a vehicle vacuum system; U.S. Pat. No. 3,090,218 shows a pipe valve and lock combination; U.S. Pat. No. 3,170,579 shows a hydraulic console locking apparatus; U.S. Pat. Nos. 1,524,904 and 1,153,189 show key actuated, fluid valves.

SUMMARY OF THE PRESENT INVENTION

The present invention is embodied within an apparatus for disabling the hydraulic system of a piece of equipment to prevent unauthorized operation of same, Earthworking equipment such as that mentioned above each include an instrumentality which is hydraulically operated and engageable with earthen material. The present system permits the utilization of the earth engaging instrumentality to, in effect, "anchor" the equipment in place by partial burial of the instrumentality and thereafter preventing operation of the equipment's hydraulic system. Accordingly, the unauthorized starting of a vehicle engine does not result in same being mobile and loss of same by theft.

Provision is made for disabling a hydraulic system by dumping pressurized hydraulic fluid back to a system reservoir to de-pressurize lines serving the various components of the equipment. In one embodiment of the invention a hydraulic pressure relief valve has been modified to house a check valve which when open bleeds off pressure from the back side of the relief valve spool to cause dumping of hydraulic fluid back to a system reservoir. Alternatively, the check valve, when closed, closes the reservoir return line for maintenance of system pressure to serve the various hydraulic components.

The present system is adapted for remote actuation of the earlier mentioned check valve by incorporating a lockable, manually operated control to in turn close or open the check valve.

Important objects of the present invention include the provision of an apparatus for convenient installation on new or used equipment which permits the operator to disable the equipment hydraulic system to prevent unauthorized use or movement of the of the equipment and hence preventing theft of same; the provision of an apparatus which includes a remote operating feature to enable the operator to control a valve located remotely from the operator's station and which in turn directs pressurized fluid toward system hydraulic components or isolate same from hydraulic pressure; the provision of an apparatus including a lockable pressure generating instrumentality which, upon being unlocked, may be actuated by the operator to pressurize a remote diaphragm serving a valve in the equipment's hydraulic system.

BRIEF DESCRIPTION OF THE DRAWING

In the accompanying drawing:

FIG. 1 is a side elevational view of a heavy construction equipment vehicle equipped with the present apparatus;

FIG. 2 is a composite sectional view of a valve component in a hydraulic system between a pressure source and a control console and check valve operating means in communication therewith;

FIG. 3 is a vertical sectional view taken along line 3—3 of FIG. 2; and

FIG. 4 is a fragmentary view of a modified form of a valve component of the present apparatus.

DETAILED DESCRIPTION OF THE PREFERRED EMBODIMENT

With continuing reference to the drawing wherein reference numerals indicate parts similarly hereinafter identified, the reference numeral 1 indicates generally a vehicle having hydraulic components and a hydraulic system with an integral source of hydraulic pressure for component operation. A typical piece of such vehicular equipment is a crawler type tractor shown used at road or building construction sites. Such equipment is not easily moved to a secured area at the end of a working day and often must be left in the open for long, unattended periods and accordingly is frequently the subject of theft or vandalism. Other like types of vehicular equipment susceptible to theft will readily come to the reader's mind.

Mobile construction equipment includes a hydraulic pressure source in the form of a pump powered by the equipment engine with pressurized fluid passing through a pump output conduit and thence normally past a pressure relief valve prior to communication with a valve console with multiple, operator-controlled valves serving the various hydraulic components. With reference to FIG. 2, a fluid pressure source is represented by a pump output conduit at 2 located upstream from a valve console (not shown).

In the preferred form of the present apparatus a hydraulic system main relief valve 3 is modified to serve present purposes to facilitate the incorporation of the present apparatus into equipment already in the field. Valve 3 is of the pilot operated type.

Relief valve 3 includes a main body 4 having inlet and outlet ports 5 and 6 and a reservoir or sump return port at 7. A spool at 8 is responsive to system hydraulic pressure exerted on its front face 10, and under certain conditions, also on its back face 11. An orifice at 12 meters fluid past the spool while a helical spring at 13 normally biases the spool forwardly toward a seat 14 at the mouth of sump return port 7 during hydraulic system operation. A needle valve 15 is in communication with the fluid receiving area at the back side of the spool. During normal operation of the equipment hydraulic system at system pressures typically between 2000 and 2400 PSI, the spool will be in the broken line position of FIG. 2 to permit the unrestricted and undiminished fluid flow through valve 3 to the valve console. Hydraulic pressure at a value above that desired will be communicated via orifice 12 to needle valve 15 which may vent pressure to a sump return line at 16. Needle valve 15 is adjustable in the usual manner as by a threaded stem at 17 acting on a valve biasing spring 18. The foregoing relief valve description is more or less typical of well known relief valve construction.

The present apparatus preferably utilizes a relief valve modified in the following manner. Main body 4 is drilled to provide a fluid passageway 22 in communication with the back side of the relief valve spool 8 and which terminates at a ball check valve 23. A second passageway 24 communicates check valve 23 with sump return line 16. Check valve 23, when unseated, permits spool 8 to be retracted by a pressure differential acting on spool faces 10 and 11.

Check valve control means generally at 27 is shown as a diaphragm type control having a housing 28 partitioned by a diaphragm 30 with the latter acting on a stem 31, and O-ring equipped plunger 32 and a ball control element 33 all of which serve to bias ball element 23 to a closed or seated position in the presence of air pressure in a diaphragm chamber 35. A spring 36 biases diaphragm 30 to the neutral position shown in FIG. 2 to open the check valve.

An air line at 37 is equipped with suitable fittings as at 38 and 39 to communicate the interior of check valve control means 27 with a source of air pressure in the form of a hand operated pump, generally at 40, located proximate the equipment operator's station for convenience sake. In those instances where the equipment hydraulic relief valve component is orientated in convenient manner to the operator, a later described check valve controls means may be utilized. A steel cable at 39 extends the length of line 37 to prevent cutting of the line and pressurizing of the line by other means.

Air pump 40 includes a piston assembly 41 with a seal 42 partially defining a pressure chamber 43. An air inlet at 44 is provided with a check valve 45 which admits filtered atmospheric air during piston retraction. Air discharged by piston travel passes via a bore 46 past an air valve 47 and into line 37 at the forward limit of piston travel whereat valve 47 is biased open by pump pressure. Continued pumping intermittently actuates air valve 47 to the open position. Said air valve may be of the type commonly used in pneumatic tires and which closes automatically in the absence of pump pressure. During such pumping action a spring 50 seats a ball check valve 51 to close a vent passageway 52 in piston 41. Air valve 47 additionally may be opened for bleeding off air pressure from check valve control means 27 by manual forward positioning of piston 41 to cause piston carried stem 48 to open valve 47 whereupon air is bled through bore 46, along vent passageway 52 in the piston, past a now unseated check valve 51 and out a port 53 to the interior of the pump cylinder from which same may escape to the atmosphere by reason of pump construction.

In the FIG. 2 full line position the air pump is in a locked (as hereinafter explained), air bleeding position ultimately resulting in spool 8 of the relief valve being in its full line to cause dumping of pressurized hydraulic fluid to the system sump or reservoir for hydraulic system disablement.

To prevent hydraulic system operation, pump piston 41 may be locked in place within pump 40 by mmeans of a tumbler type, rotary lock 54 as explained below. A fingergrip at 56 is coupled to the pump piston by a sleeve 55 and a sleeve carried pin 57 confined within an arcuate recess 58 extending through ninety degrees about the axis of a piston extension 41A. Reciprocation of sleeve 55 accordingly imparts reciprocal movement to piston 41.

A pump locking arrangement is provided, as best viewed in FIG. 2, by ball elements at 61 and 62 which seat within an internal annular groove 63 in a pump end cap 40A and while so positioned serve to obstruct rearward movement of piston 41 having a rearward shoulder 41B. Unlocking of the piston is accomplished by the partial rotation of piston 41 and its extension 41A by a key actuated rotatable lock element 54A which is seated within a recess 65 in the extension of corresponding sectional shape. Piston extension 41A is of oval section as best seen in FIG. 3 with partial rotation of same by the lock element through ninety degrees to the broken line position permitting ball elements 61 and 62 to be displaced or "cammed" inwardly toward the extension axis by piston shoulder 41B being rearwardly urged by manual effort. Sleeve 55 is notched at its inner end to restrain ball elements 61 and 62 against rotary movement. During unlocking, the sleeve 55 is held manually against rotation. A spring biased ball at 66 serves to indicate the rearward limit of travel by engaging annular groove 63 during pump operation. Further, ball 66 seats in groove 63 to prevent inadvertent outward movement.

A preferred form of the present apparatus is disclosed in FIG. 4 which form is intended for use where the equipment operator has convenient access to the main relief valve of the hydraulic system. In the modified form a main relief valve at 66 is substantially identical to the earlier described relief valve and having a fluid passageway 67 in communication with the back side of a valve spool not shown. A ball check valve 68 controls communication between passageway 67 and a second passageway 69 which ultimately communicates with a return to the system sump as in the first form of the invention. Ball check valve 68 is biased by locking means including a rotary lock plunger 70 of key operated means at 71 suitably housed within a cylinder 72. Plunger 70 acts on its O-ring equipped pin 73 to urge some against the ball check valve to seat same to close passageway 67 during normal hydraulic operation. Retraction of lock plunger 70 permits venting of the spool (not shown) backside to permit hydraulic pressure acting on the spool front face to displace the spool to open a sump return line in the same manner described with the first form of the apparatus. Plunger 70 is in a first position when retracted to open said check valve while a second position thereof is when plunger 70 is closing the check valve.

While the present apparatus has been described in structural association with the main relief valve of a hydraulic system, it is to be understood that such association is for convenience sake and not by reason of necessity as valves 3 and 66 could serve their present function without incorporation of relief valve components.

In the first and second described forms of the apparatus a relief valve which readily lends itself to modification to satisfy present purposes is one manufactured by the Commercial Shearing Company and used in various types of equipment hydraulic systems.

As shown in FIG. 1, at the end of a workday the earth working equipment, such as tractor 1, may lower its earth working instrumentality or blade B into the ground to, in effect, "anchor" the machinery in place regardless of an unauthorized operator starting the tractor engine. The same may be said for other types of earth working vehicular equipment.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A lockable apparatus for diverting pressurized hydraulic fluid from a pump output conduit of a vehicle used in earth moving operations to a hydraulic system reservoir to disable hydraulically operated components of the vehicle to prevent unauthorized vehicle operation, said appartus comprising, a valve body including fluid inlet and outlet ports and a reservoir return port, a spring biased valve spool having front and rear faces and defining an orifice extending therebetween, said spool faces responsive to fluid pressures with the spool having a first position whereat the spool opens said reservoir return port for fluid passage through said return port to prevent hydraulic component operation and a second position whereat said reservoir return port is closed for directing pressurized hydraulic fluid to said outlet port for normal hydraulic component operation, means urging said spool to a reservoir return port closing position, check valve means in upstream fluid communication with an area partially defined by one face of said spool and in downstream communication with the system reservoir whereby closure of the check valve will cause fluid pressure increase on said one face which pressure in conjunction with said urging means relocates said spool to close said reservoir return port for normal operation of the hydraulic system components, and check valve control means mounted on said valve body and having a first position opening the check valve to cause positioning of said spool to open the reservoir return port to divert fluid to the system reservoir to prevent operation of system hydraulic components, said control means having a second position to close the check valve to cause repositioning of said spool and closure of said return port for normal system component operation, said check valve control means including a lock on the valve body and having a plunger acting on said check valve means and enabling locking of same in said first or second position.

2. The apparatus claimed in claim 1 wherein said valve body additionally incorporates an adjustable pilot operated relief valve with said spool also serving as a pilot operated relief valve spool.

3. In a pilot operated relief valve having a main body with a pressure responsive spring biased spool controlling fluid flow to hydraulic components of a vehicle hydraulic system or alternatively directing the entire flow to a reservoir of the system to immobilize said components and prevent vehicle operation, the improvement comprising, a ball check valve in fluid communication with one side of said spool, said check valve when open serving to vent fluid pressure from said one side of said spool to permit the spool to divert all fluid flow directly back to the system reservoir to disable vehicle components, said check valve when closed serving to cause a pressure increase on said spool to thereby shift same whereat fluid flow is directed toward system hydraulic components, a manually settable needle valve also in communication with said one side of said spool, check valve control means comprising locking means including a plunger slidably mounted within said main body of the relief valve, said plunger having a first position to open said check valve and a second position to close said check valve, key operated means acting on said plunger.

* * * * *